(12) United States Patent
Braeutigam

(10) Patent No.: US 9,254,921 B2
(45) Date of Patent: Feb. 9, 2016

(54) AIR INLET COMBINING A FILTER AND A BYPASS DEVICE FOR USE WITH A TURBINE ENGINE

(71) Applicant: AIRBUS HELICOPTERS DEUTSCHLAND GMBH, Donauworth (DE)

(72) Inventor: Ralf Braeutigam, Tapfheim (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 538 days.

(21) Appl. No.: 14/101,405

(22) Filed: Dec. 10, 2013

(65) Prior Publication Data

US 2014/0158833 A1    Jun. 12, 2014

(30) Foreign Application Priority Data

Dec. 11, 2012  (EP) .................................... 12400053

(51) Int. Cl.
- *B64D 33/02* (2006.01)
- *B64C 27/04* (2006.01)

(52) U.S. Cl.
CPC ................. *B64D 33/02* (2013.01); *B64C 27/04* (2013.01); *B64D 2033/0246* (2013.01); *B64D 2033/0293* (2013.01)

(58) Field of Classification Search
USPC .......................... 244/53 B; 60/39.092; 55/306
See application file for complete search history.

(56) References Cited

U.S. PATENT DOCUMENTS

| | | | |
|---|---|---|---|
| 3,411,272 A | 11/1968 | Carmon | |
| 5,662,292 A | 9/1997 | Greene et al. | |
| 5,697,394 A * | 12/1997 | Smith | B64D 33/02 137/15.1 |
| 6,264,137 B1 * | 7/2001 | Sheoran | B64D 33/02 244/53 B |
| 6,595,742 B2 * | 7/2003 | Scimone | B64D 33/02 244/53 E |
| 7,014,144 B2 * | 3/2006 | Hein | B64D 33/02 244/53 B |
| 7,491,253 B2 * | 2/2009 | Wilson | B01D 46/002 123/198 E |
| 7,866,600 B2 * | 1/2011 | Barnard | B01D 46/0013 244/53 B |
| 8,439,295 B2 * | 5/2013 | Belyew | B01D 46/10 244/53 B |
| 8,819,937 B2 * | 9/2014 | DeDe | B64D 41/00 29/896.6 |
| 8,961,634 B2 * | 2/2015 | Boyce | B01D 46/103 D46/103 |
| 2002/0182062 A1 | 12/2002 | Scimone | |
| 2013/0313371 A1 * | 11/2013 | Lamb, Jr. | F02C 7/04 244/53 B |
| 2015/0096627 A1 * | 4/2015 | Dailey | F02C 7/04 137/15.1 |

FOREIGN PATENT DOCUMENTS

| | | |
|---|---|---|
| EP | 2282031 | 2/2011 |
| WO | 2008076471 A2 | 6/2008 |
| WO | 2008076471 A3 | 6/2008 |

OTHER PUBLICATIONS

European Search Report for EP 12400053, Completed by the European Patent Office on May 17, 2013, 5 Pages.

\* cited by examiner

*Primary Examiner* — Christopher P Ellis
(74) *Attorney, Agent, or Firm* — Brooks Kushman P.C.

(57) ABSTRACT

An air inlet (10) for an engine (20) of an aircraft (50), the air inlet (10) having a duct (2) feeding outside air to said engine (20) together with a filter system combining at least one filter (3) and at least one bypass device (4). Said filter (3) and said bypass device (4) are fastened on a common support (1) situated at one end of said duct (2) and on a flank of a fuselage (51) of said aircraft (50). Said bypass device (4) comprises a cover (5) and an actuator (6) controlling opening of said cover (5). Thus, when said filter (3) no longer allows outside air to pass therethrough, said cover (5) is opened, and outside air passes via the bypass device (4) in order to feed said engine (20) with outside air.

8 Claims, 3 Drawing Sheets

AIR INLET COMBINING A FILTER AND A BYPASS DEVICE FOR USE WITH A TURBINE ENGINE

CROSS REFERENCE TO RELATED APPLICATION

This application claims priority to European patent application No. 12 400053.0 filed Dec. 11, 2012, the disclosure of which is incorporated in its entirety by reference herein.

BACKGROUND OF THE INVENTION (1) Field of the Invention

The present invention relates to an air inlet for an engine and more particularly for a turbine engine of a rotary wing aircraft. This air inlet is provided with a filter system combining at least one barrier filter with at least one bypass device. The technical field of the invention is thus the field of turbine engine air inlets, and more particularly the field of filter systems for such air inlets.

(2) Description of Related Art

In order to feed each engine of an aircraft with outside air and thus enable the engine(s) to operate, the aircraft has at least one air inlet, each air inlet being provided with a filter system and with a duct connecting the engine(s) to the outside air.

Furthermore, each air inlet may be positioned in various locations relative to the engine and to the forward direction of the aircraft. More particularly, two types of air inlet may be distinguished.

Firstly, a longitudinal or axial air inlet can be placed facing the main advance direction of the aircraft. Such an inlet is also said to be "dynamic" since it is fed with outside air under the effects both of the forward speed of the aircraft and of the suction from the engine; and Secondly, a lateral or radial air inlet can be placed perpendicularly to the main forward direction of the aircraft, i.e. in general in the side or in the top of the fuselage of the aircraft. Such an inlet is also said to be "static", since it is fed with air solely under the effect of suction from the engine.

Aircraft can be required to operate in a wide variety of environments and conditions, and each engine of such aircraft must therefore be protected in order to be able to withstand such environments and such conditions.

Firstly, the wash from the lift rotor of a rotary wing aircraft often raises dust during takeoff and landing, together with gravel lying on the ground. It is therefore essential to protect the air inlet of each engine to avoid it ingesting any raised elements. It is also necessary to protect each engine from various particles in suspension in the air, in particular when the aircraft is used in sandy regions where the air can be saturated with particles of sand.

For this purpose, each air inlet of the aircraft is provided with at least one filter system for stopping such particles and thus protecting each engine. Such filter systems make use of various types of filter, such as barrier filters with one or more paper or fabric layers to stop particles in suspension or vortex filters that create a vortex for the purpose of separating particles from the ingested air.

Secondly, aircraft may be required to fly in so-called "icing" conditions. During this type of flight, ice can obstruct the air inlet of an engine in part or even in full, in particular by ice becoming attached to the barrier filter. Thus, each filter may become partially or even completely obstructed by ice.

Similarly, various particles such as dust or sand can obstruct each filter of the filter system in part or in full, in particular when using barrier filters, thereby limiting or even preventing outside air from passing to the engine.

Consequently, the feed of outside air to the engine is reduced or even interrupted, thereby giving rise to a significant or even total loss of the power developed by the engine, which can lead to an accident.

Consequently, in order to guarantee that each engine of the aircraft can operate, and in particular in order to guarantee that it is fed with outside air, regardless of the outside conditions and the environment of the aircraft and regardless of the state of the air inlet filter, an aircraft maker can provide a passage for feeding outside air to the engine while avoiding the filter. Such a device ensures flight is safe when flying in an atmosphere that is, for example, loaded with particles or with ice. Indeed, such a device is required by certain aviation certifications. Such a device is commonly referred to as a "bypass device" since it is used when filter is obstructed.

Document U.S. Pat. No. 3,411,272 describes a filter system for a helicopter engine, the system having a closed position for filtering air and an open position for allowing air to pass without being filtered, i.e. a bypass position. That filter system has filtering louvers that touch one another in the closed position so as to filter air. Some of the louvers are movable and pivot in order to open the filter system in the bypass position, where necessary.

Document WO 2008/076471 also describes a filter system for an aircraft engine, the filter system possessing one or more filter panels flush with the outside surface of the aircraft. Each filter panel is connected to an actuator enabling the entire filter panel to be pivoted and thus enabling air to pass without passing through the filter panel, thereby creating a bypass position. Nevertheless, that filter system moves the entire filter panel, which may be bulky and heavy, thus requiring an actuator that is powerful.

Document U.S. Pat. No. 5,662,292 describes a filter system for a helicopter engine. That filter system has filter zones in front and on the sides relative to the longitudinal direction of the helicopter, thereby allowing air to enter equally well while the helicopter is flying forwards and while it is flying sideways. That filter system includes a flap situated on the top of the filter and suitable for tilting under the effect of a spring into a bypass position, thereby releasing an opening that allows air to pass without passing through the filter zones.

Finally, document EP 2282031 describes a filter system that incorporates a bypass device. That filter system is adapted for a radial air inlet of an engine and comprises an annular filter having a stationary portion and a movable portion. The movable portion of the annular filter pivots about the axis of the engine and of the annular filter, and thus makes it possible to release the air inlet of the annular filter, thereby creating a bypass position.

Other filter systems exist and some of them have two different air flow ducts, one duct feeding the engine with filtered air and the other duct being specific to the bypass device. However, such filter systems can be quite complex and heavy. Furthermore, the use of two different feed ducts can give rise in the air inlet to differences of temperature and pressure in the air being fed to the engine, thereby giving rise to variations in the performance of the engine. In addition, during a flight, it is possible that dust, sand, or debris can accumulate in the specific flow duct of the bypass device and subsequently be sucked into the engine when the bypass device is put into operation.

BRIEF SUMMARY OF THE INVENTION

An object of the present invention is to provide an alternative air inlet solution that makes it possible to avoid the above-mentioned limitations while simplifying the air inlet.

According to the invention, an air inlet for an aircraft engine comprises a duct feeding an engine of the aircraft with outside air and a filter system with at least one filter and at least one bypass device. Each duct then has at least two ends, at least one end of the duct picking up outside air through the filter system and the other end feeding the engine with that outside air. If the aircraft has a plurality of engines, it has a plurality of air inlets, generally one air inlet for each engine.

The air inlet is remarkable in that the filter and the bypass device are fastened to a common support, which support is situated at one end of the duct. The filter system preferably has a single filter and a single bypass device in order to simplify the air inlet of the invention. Furthermore, the duct may be an element that is incorporated in the support. Thus, the outside air fed to the engine passes through the filter in order to avoid particles in suspension in the air and dust or even sand, for example, from penetrating into the duct and consequently into the engine.

The bypass device serves to mitigate a malfunction of the filter by allowing outside air direct access to the duct, and consequently to the engine, without passing through the filter. When the filter is obstructed by dust, sand, or indeed ice, for example, whether completely or in part, the feed of outside air to the duct and consequently to the engine is reduced significantly, or even completely. As a result, the engine loses a large fraction or even all of its power.

The bypass device thus makes it possible to guarantee that the engine is fed with outside air and thus that it operates, regardless of the state of the filter. The outside air used by the engine is then not filtered and may have particles in suspension. Nevertheless, this kind of operation allows the engine to deliver its nominal power and thus makes it possible to avoid an accident to the aircraft, with the duration of such operation remaining limited, and with it being necessary to perform a maintenance operation such as cleaning or replacing the filter before the next flight of the aircraft. The impact on the engine is therefore small, and in any event much less severe than the engine losing a large amount or all of its power while in flight.

Advantageously, since the filter and the bypass device are fastened on a common support, they are easy to assemble and install on the aircraft. The filter and the bypass device can be assembled on the support easily away from the aircraft. Thereafter, the support together with the filter and the bypass device can be installed on the aircraft in a manner that is simple and fast, with there being only one element, the support that needs to be fastened to the structure of the aircraft.

Furthermore, the duct may be incorporated in the support, and then the air inlet of the invention is constituted by a single element.

Furthermore, since the support is situated at one end of the duct, outside air travels along the same duct regardless of whether it passes to the filter or to the bypass device. The outside air fed to the engine thus has characteristics that are identical or very similar regardless of whether it passes through the filter or through the bypass device. The characteristics in question are in particular the temperature and the pressure of the air being fed to the engine. Consequently, the performance of the engine remains unchanged regardless of whether the outside air passes through the filter or else through the bypass device.

Furthermore, grouping the filter and the bypass device together on a common support enables the weight of the filter system to be reduced compared with the assemblies that are used conventionally.

The bypass device may have a cover movable relative to the support and an actuator for controlling the opening of the cover. By way of example, the actuator is a hydraulic actuator and the cover pivots under drive from the actuator. An opening is then created between the cover and the support to allow outside air to flow directly into the duct without passing through the filter. The engine can then be fed with outside air, even if the filter is obstructed with dust, sand, or even ice, for example.

In addition, opening of the cover may depend on a malfunction of the filter and may consequently correspond to the engine requiring outside air. If the filter is obstructed in part or indeed in full, it may pass a reduced amount of outside air or even no outside air. Then, the air inlet of the invention may have at least a sensor for detecting the deficit of the air feeding the engine or for detecting the level of obstruction of the filter. For example, one pressure sensor is inside the filter (or after the filter) and one sensor is on the outside of the filter for measuring a differential pressure. By adapting the size of the opening obtained with the cover, the bypass device makes it possible to match the quantity of unfiltered outside air that is fed to the engine with the requirements of the engine, and can thus serve to avoid debris of large size penetrating into the duct.

Furthermore, the bypass device may include a gasket providing sealing between the cover in the closed position and the support. As a result, when the cover is closed, outside air can enter into the duct solely by passing through the filter. Consequently, all particles or dust is/are stopped by the filter, thereby protecting the engine. No particles or dust can penetrate into the duct whether through the filter or through the bypass device, and in particular through the junction between the cover and the support.

The air inlet of the invention may be situated in a side or on the top face of the aircraft relative to its longitudinal axis. The longitudinal axis corresponds to the main forward direction of the aircraft. The air inlet of the invention may be preferably situated in a flank of the fuselage of the aircraft. By way of example, the air inlet is situated on the right or left flank of the fuselage. In addition, the air inlet is then of the lateral or radial type. If the aircraft has two engines, the first air inlet may then be situated on the right of the fuselage and the second air inlet on the left of the fuselage in order to feed air respectively to each of the engines.

Preferably, the filter and the cover of the bypass device are flush with the outside surface of the fuselage. As a result, no element of the air inlet of the invention projects from the outside surface of the fuselage. Consequently, no significant aerodynamic drag is generated by the air inlet of the invention. Similarly, no element of the air inlet of the invention is set back from the outside surface of the fuselage. As a result, no debris or particles can accumulate, in particular in front of the cover of the bypass device, thereby avoiding any risk that such debris or particles might penetrate into the duct when the cover of the bypass device is opening.

In addition, although the bypass device may be situated below or above or beside the filter, the bypass device and the filter are always situated side by side, being fastened on a common support.

The present invention also provides an aircraft having at least one air inlet of the invention, each engine of the aircraft being fed with outside air via at least one air inlet.

BRIEF DESCRIPTION OF THE SEVERAL
VIEWS OF THE DRAWINGS

The invention and its advantages appear in greater detail from the following description of embodiments given by way of illustration and with reference to the accompanying figures, in which.

Elements present in more than one of the figures are given the same references in each of them.

Figure 1:
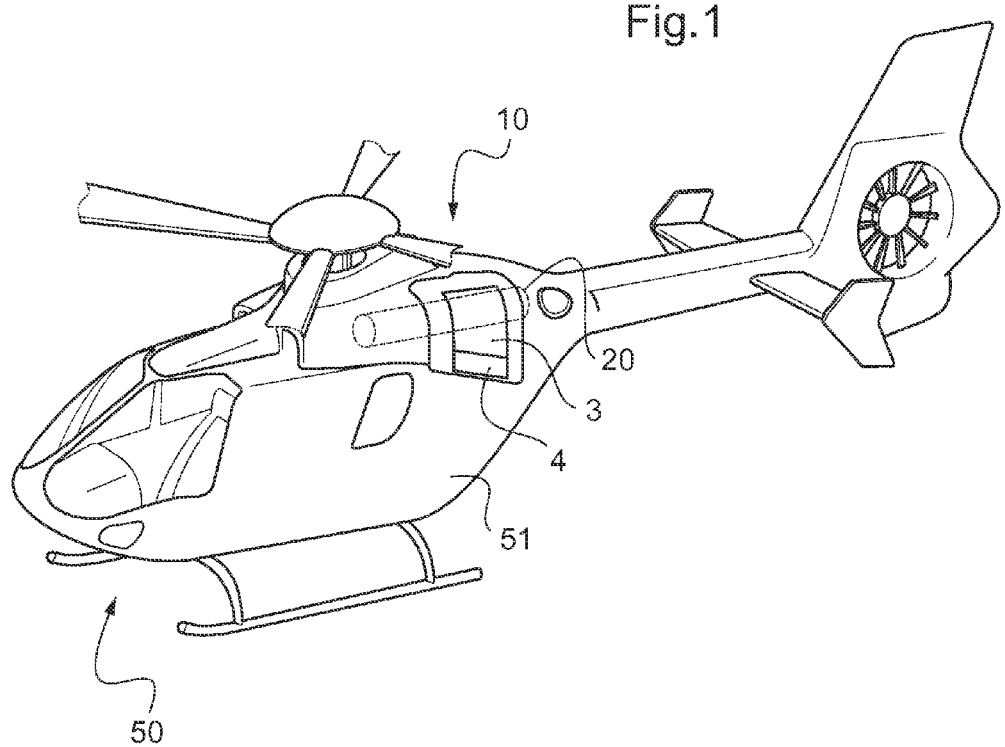
FIG. 1 shows a rotary wing aircraft having an air inlet of the invention.

FIG. 1 shows a rotary wing aircraft 50 having a fuselage 51 and an air inlet 10 of the invention, which air inlet includes in particular a filter system with a filter 3 and a bypass device 4. FIGS. 2 to 5 show this air inlet 10 in greater detail, the bypass device 4 being shown inactive in FIGS. 2 and 3 and being shown active in FIGS. 4 and 5.

DETAILED DESCRIPTION OF THE INVENTION

The air inlet 10 is situated in a flank of the fuselage 51 of the aircraft 50 and it is said to be "lateral" or "radial". It is connected to an engine 20 of the aircraft 50 that it feeds with outside air. The aircraft 50 may have at least one other engine fed by another air inlet, e.g. an inlet situated in the other flank of the fuselage 51 of the aircraft 50. Furthermore, the air inlet 10 may also be situated in the top of the fuselage 51.

The air inlet 10 thus serves to feed outside air to the engine 20, and the filter 3 stops various particles that are in suspension in that outside air for the purpose of protecting the engine 20. The filter 3 type is barrier filters, such as a paper filter.

The bypass device 4 enables outside air to be fed directly to the engine 20 without passing through the filter 3 when the filter 3 is partially or even completely obstructed by dust or by sand, for example. Under such circumstances, the filter 3 of the air inlet 10 prevents outside air being fed normally to the engine 20 and its operation can then become very degraded.

FIGS. 2 to 5 show the air inlet 10, the bypass device 4, and the way in which it operates in greater detail. The filter 3 and the bypass device 4 are situated on a common support 1 and a duct 2 connects the engine 20 to the support 1 and thus to the filter system. Thus, outside air passes through the filter 3 or else through the bypass device 4, and then along the duct 2 before being fed to the engine 20. Since the filter 3 and the bypass device 4 are fastened on the common support 1, they are connected to the same duct 2. The air inlet 10 is thus simplified, having only one support 1 and only one duct 2. Consequently, its weight can be less than that of a conventional air inlet that is provided with a bypass device 4. Furthermore, the duct 2 may be an element that is incorporated in the support 1. Thus, assembling the air inlet 10 of the invention and installing it on the aircraft 50 are simplified.

Figure 2:
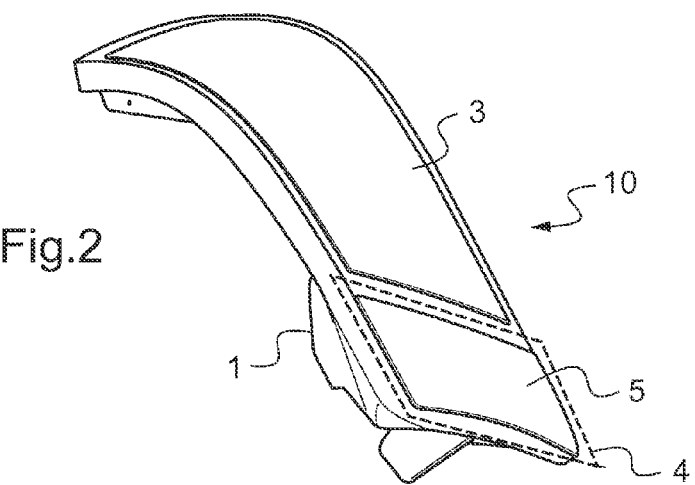
FIG. 2 is a view of the air inlet of the invention with the bypass device being shown inactive.
Figure 3:
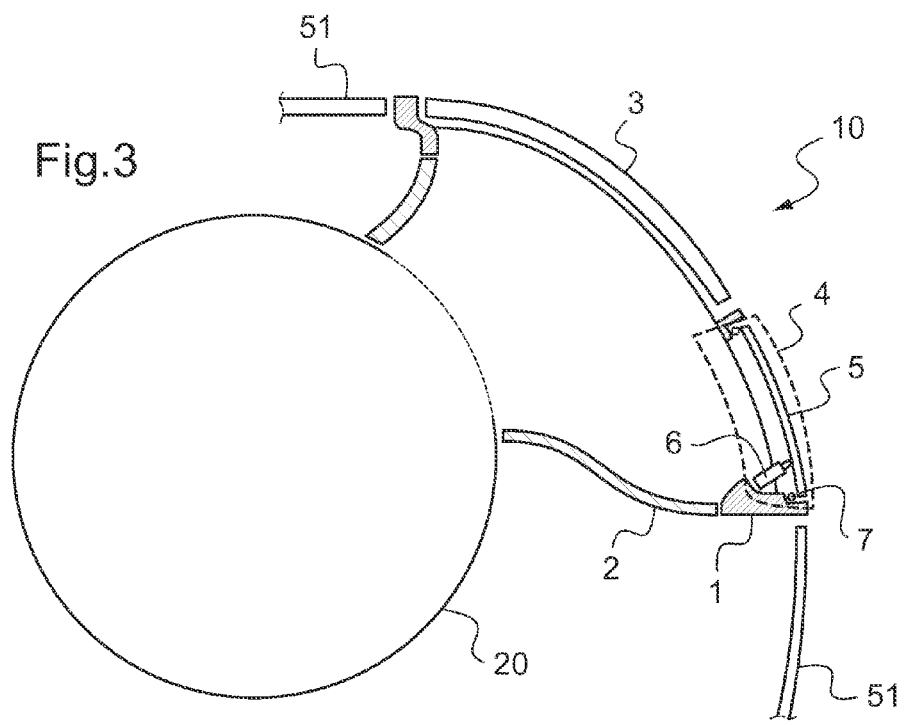
FIG. 3 is a section of the air inlet of the invention with the bypass device being shown inactive.

The bypass device 4 has a cover 5 movable relative to the support 1 and an actuator 6. When the bypass device 4 is inactive, i.e. when it does not allow outside air to pass so the outside air must therefore pass through the filter 3 in order to feed the engine 20, the cover 5 is closed on the support 1, as shown in FIGS. 2 and 3.

Furthermore, a gasket 7 provides sealing between the cover 5 and the support 1. This gasket 7 prevents non-filtered outside air from penetrating into the duct 2 and thus into the engine 20.

Figure 4:
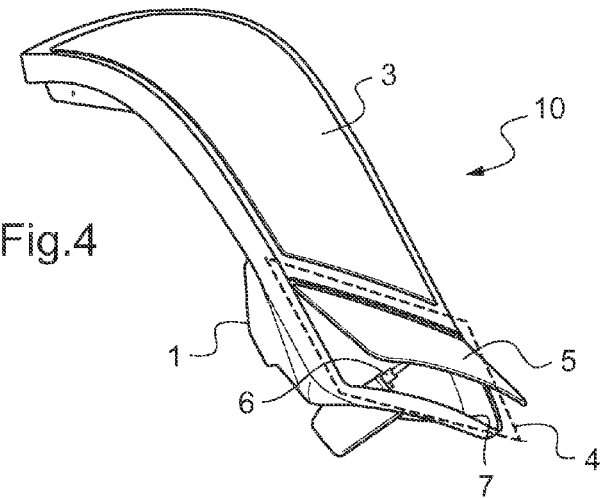
FIG. 4 is a view of the air inlet of the invention with the bypass device being shown active.
Figure 5:
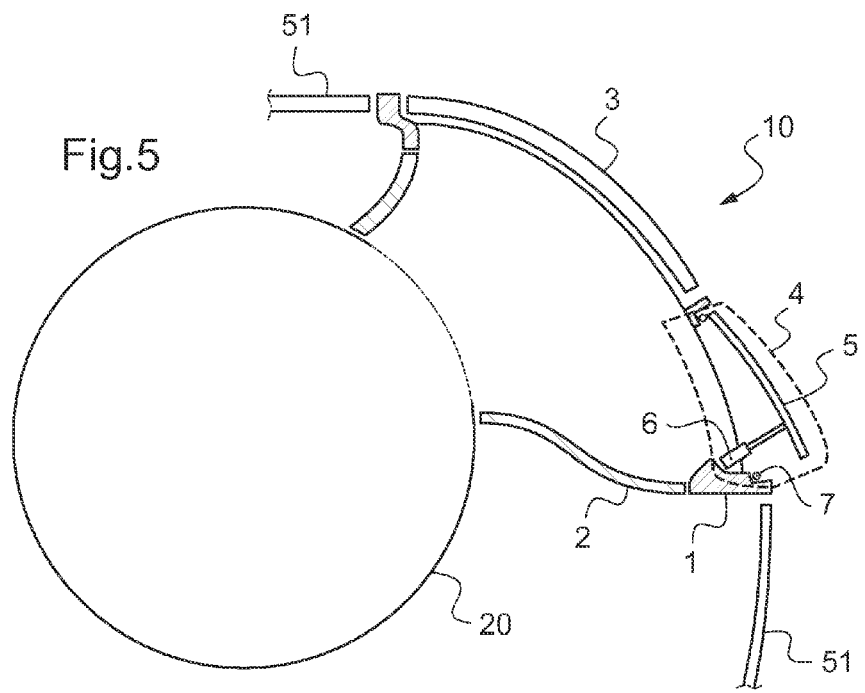
FIG. 5 is a section of the air inlet of the invention with the bypass device being shown active.

In contrast, when the bypass device 4 is active, i.e. when it allows outside air to pass without passing necessarily through the filter 3 in order to feed the engine 20, the cover 5 is open and allows the outside air to pass between the cover 5 and the support 1, as shown in FIGS. 4 and 5.

This opening of the cover 5 may be obtained by means of an actuator 6 and a hinge (not shown) connecting one edge of the cover 5 to the support 1. The cover 5 can pivot about the hinge under drive from the actuator 6, e.g. a hydraulic actuator, thereby releasing an opening between the cover 5 and the support 1.

Naturally, the present invention may be subjected to numerous variations as to its embodiment. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An air inlet for an engine of an aircraft, the inlet comprising:
    a duct for feeding outside air to said engine;
    at least one filter and
    at least one bypass device allowing said outside air to pass therethrough when said filter is obstructed;
    the air inlet being characterized in that said duct, said filter and said bypass device are fastened to a common support, said support being situated at one end of said duct and being fastenable to the aircraft so that the filter and the bypass device can be assembled on the support away from the aircraft.

2. An air inlet according to claim 1, wherein said bypass device comprises a cover movable relative to said support and at least an actuator for controlling opening of said cover.

3. An air inlet according to claim 2, wherein said cover pivots under drive from said actuator.

4. An air inlet according to claim 2, wherein said bypass device includes a gasket providing sealing between said cover in a closed position and said support.

5. An aircraft having at least one engine, said aircraft including at least one air inlet according to claim 1, each engine being fed with outside air by at least one air inlet.

6. An aircraft according to claim 5, wherein said aircraft has a fuselage and the support of the air inlet is in a flank of said fuselage.

7. An aircraft according to claim 6, wherein the filter and the bypass device of the air inlet are flush with said fuselage.

8. An aircraft according to claim 6, wherein the air inlet comprises a cover movable relative to the support and in that said cover is flush with said fuselage.

* * * * *